(12) United States Patent
Riddell et al.

(10) Patent No.: US 8,511,921 B2
(45) Date of Patent: Aug. 20, 2013

(54) SYSTEM AND METHOD FOR ARRANGING WIND TURBINE BLADES

(75) Inventors: Scott Gabell Riddell, Greer, SC (US); Michael Claude Ebner, Atlanta, GA (US); Rene Michel Beukers, Groningen (NL); Hendrik Cejus de Roo, Bedum (NL)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 12/632,231

(22) Filed: Dec. 7, 2009

(65) Prior Publication Data
US 2011/0131809 A1    Jun. 9, 2011

(51) Int. Cl.
*B60P 7/08*    (2006.01)
(52) U.S. Cl.
USPC .................................. 401/44; 410/35; 410/45
(58) Field of Classification Search
USPC .................... 410/34, 35, 44, 45, 53; 280/404
See application file for complete search history.

(56) References Cited

U.S. PATENT DOCUMENTS

| | | | |
|---|---|---|---|
| 2,335,692 A | 11/1943 | Murray | |
| 2,725,241 A | 11/1955 | Leonard, Jr. | |
| 2,808,288 A | 10/1957 | Benson | |
| 5,947,665 A | 9/1999 | Baur et al. | |
| 6,983,844 B2 | 1/2006 | O'Kane et al. | |
| 7,713,007 B2 * | 5/2010 | Kootstra | 410/44 |
| 7,967,536 B2 | 6/2011 | Broderick et al. | |
| 8,313,272 B2 * | 11/2012 | Koike | 410/44 |
| 2003/0175089 A1 | 9/2003 | Almid | |
| 2006/0251517 A1 * | 11/2006 | Grabau | |
| 2008/0296197 A1 | 12/2008 | Kootstra | |

FOREIGN PATENT DOCUMENTS

WO    WO 2005/005286    1/2005

* cited by examiner

*Primary Examiner* — Stephen Gordon
(74) *Attorney, Agent, or Firm* — Dority & Manning, PA

(57) ABSTRACT

A system for arranging wind turbine blades includes first and second root cradles and a first tip cradle proximate to the second root cradle, wherein the first tip cradle is angled approximately 30 to 60 degrees with respect to a horizontal line. The system also includes a second tip cradle proximate to the first root cradle, wherein the second tip cradle is angled approximately 30 to 60 degrees with respect to the horizontal line. A method for arranging wind turbine blades includes transferring a first wind turbine blade to a first root cradle and transferring a second wind turbine blade to a second root cradle. The method further includes rotating at least a portion of the first wind turbine blade about at least a portion of the second wind turbine blade.

17 Claims, 12 Drawing Sheets

SYSTEM AND METHOD FOR ARRANGING WIND TURBINE BLADES

FIELD OF THE INVENTION

The present invention generally involves wind turbine blades. In particular, the present invention discloses and enables systems and methods for arranging at least two wind turbine blades for storage and/or transport.

BACKGROUND OF THE INVENTION

Wind turbines are well known in the art for converting kinetic energy from the wind to mechanical or electrical energy, and wind turbine blades exist in various shapes and sizes. For example, some blades include a root at one end and a tip at the opposite end. The blade root attaches to a rotor, and the blade extends radially outward from the blade root to the blade tip. The blade may have a rounded or curved leading edge (i.e., the edge facing the direction of rotation) and a tapered or pointed trailing edge (i.e., the edge facing away from the direction of rotation), producing a blade with an aerodynamic or airfoil shape. In addition, the blade may be curved from the blade root to the blade tip, creating a convex surface on the top of the blade (i.e., the surface of the blade facing toward the oncoming wind) and a concave surface on the back of the blade (i.e., the surface of the blade facing away from the oncoming wind).

The length, width, curvature, and weight of wind turbine blades varies, depending on the size of the wind turbine, anticipated wind speeds, and other design considerations. For example, wind turbine blades may extend greater than 100 feet, have an effective width of 9 feet or greater, curve more than 6 feet from blade root to blade tip, and weigh more than 13,000 pounds.

State and local transportation regulations include limits regarding the maximum allowed width and height of items transported on public roads. For example, in the U.S., the maximum allowable width is typically 8½ feet, and the maximum allowable height ranges between 13½ and 14 feet, depending on the location. In Europe, the maximum allowable width is typically 11 feet 5¾ inches, and the maximum allowable height is 14 feet 7 inches. As a result, the size, shape, and weight of wind turbine blades generally requires that wind turbine blades be transported individually so as to not exceed the allowable size limits, increasing the cost of transporting wind turbine blades.

Therefore, the need exists for an improved system and method for arranging wind turbine blades for transport and/or storage so that more than one wind turbine blade can be transported at the same time on public roads.

BRIEF DESCRIPTION OF THE INVENTION

Aspects and advantages of the invention are set forth below in the following description, or may be obvious from the description, or may be learned through practice of the invention.

In one embodiment of the present invention, a system for arranging first and second wind turbine blades includes a first root cradle and a second root cradle opposed to the first root cradle and separated from the first root cradle. The system further includes a first tip cradle proximate to the second root cradle, wherein the first tip cradle defines a first support plane angled approximately 30 to 60 degrees with respect to a horizontal line. The system also includes a second tip cradle proximate to the first root cradle, wherein the second tip cradle defines a second support plane angled approximately 30 to 60 degrees with respect to the horizontal line.

Another embodiment of the present invention is a method for arranging at least two wind turbine blades. The method includes transferring a first wind turbine blade to a first root cradle and rotating the first wind turbine blade so that the first wind turbine blade is angled approximately 30 to 60 degrees with respect to a horizontal line. The method further includes transferring a second wind turbine blade to a second root cradle and rotating the second wind turbine blade so that the second wind turbine blade is angled approximately 30 to 60 degrees with respect to the horizontal line.

Another method for arranging at least two wind turbine blades within the scope of the present invention includes transferring a first wind turbine blade to a first root cradle and transferring a second wind turbine blade to a second root cradle. The method further includes rotating at least a portion of the first wind turbine blade about at least a portion of the second wind turbine blade.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof, is set forth more particularly in the remainder of the specification, including reference to the accompanying figures, in which.

DETAILED DESCRIPTION OF THE INVENTION

Figure 1:
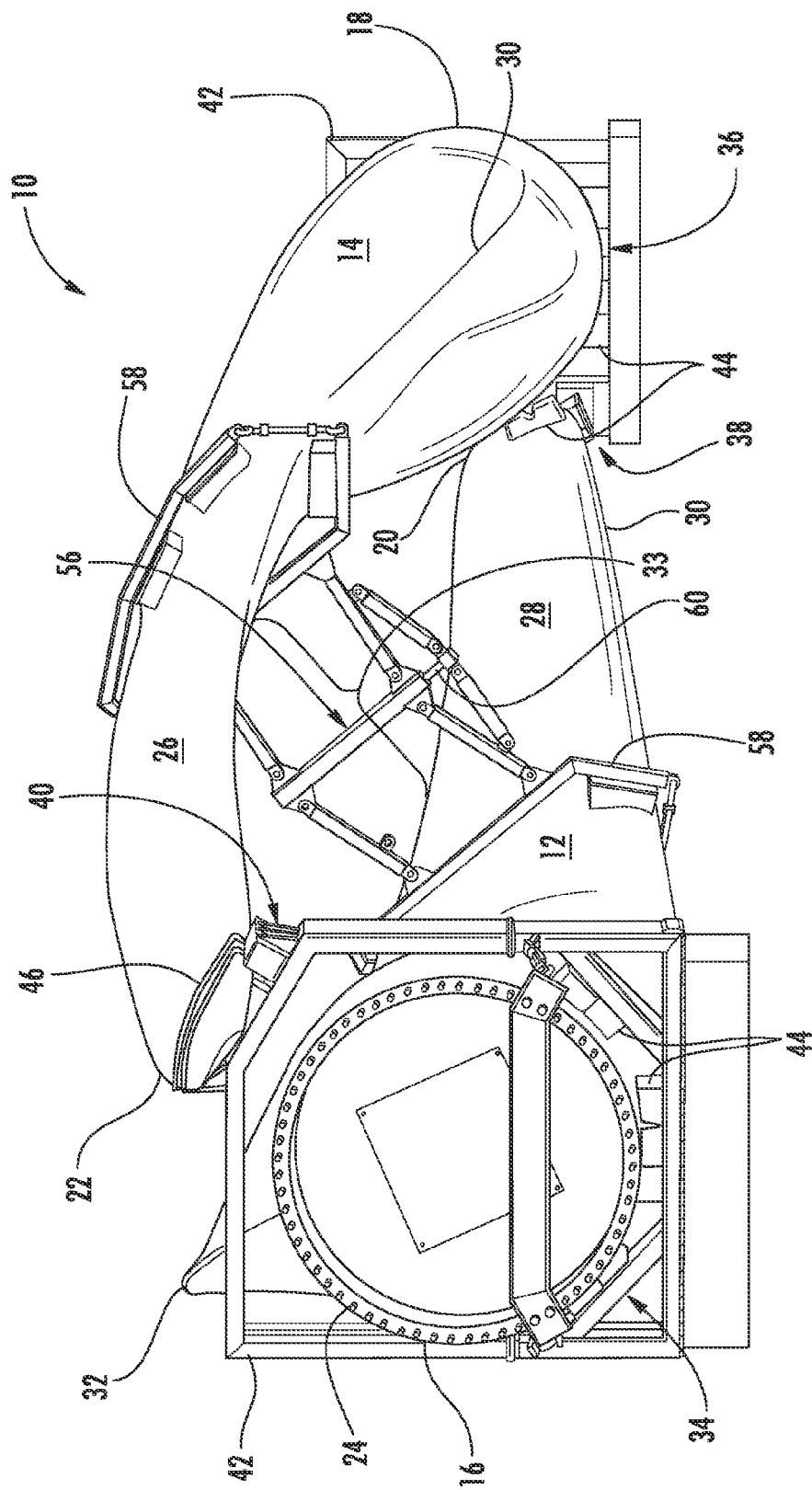
FIG. 1 is a perspective view of a system for arranging wind turbine blades according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not as a limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
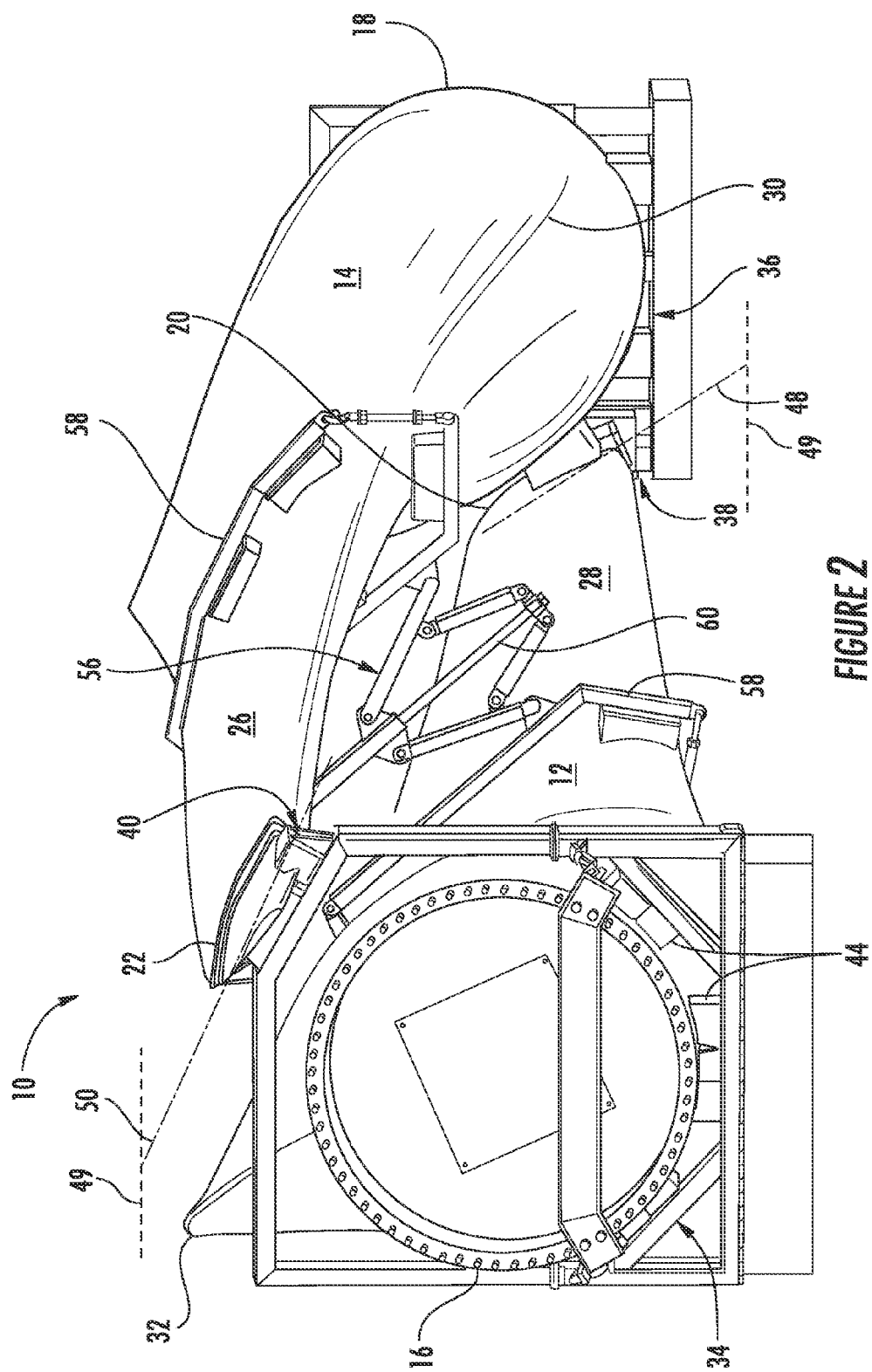
FIG. 2 is a perspective view of the system and wind turbine blades shown in FIG. 1 with the middle of the wind turbine blades drawn closer together.
Figure 3:
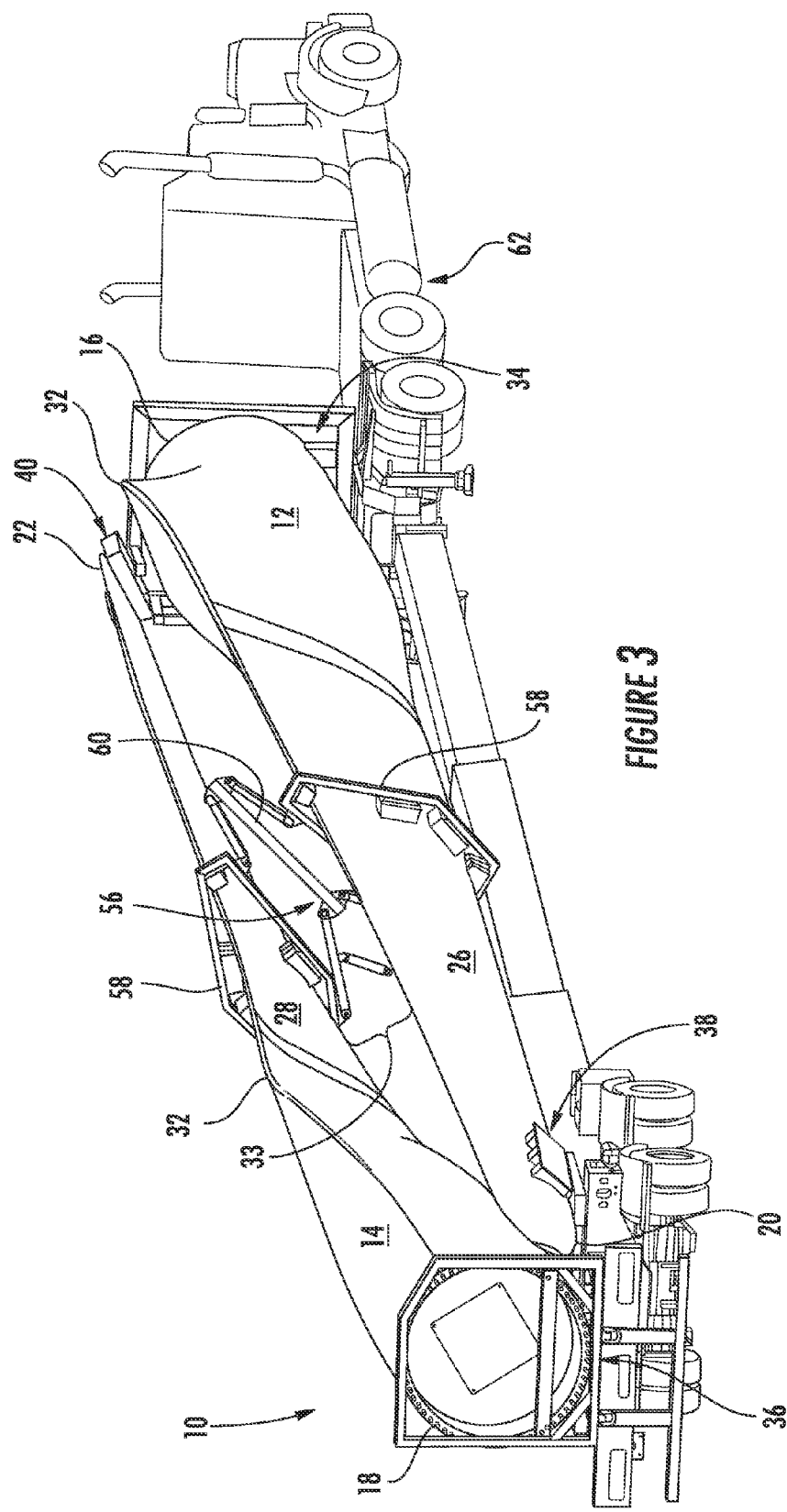
FIG. 3 is a perspective view of the system and wind turbine blades shown in FIG. 2 loaded on a commercial carrier.

FIGS. 1, 2, and 3 provide perspective views of a system 10 for arranging first and second wind turbine blades 12, 14 for transport and/or storage according to one embodiment of the present invention. Each wind turbine blade 12, 14 generally includes a blade root 16, 18 at one end and a blade tip 20, 22 at the opposite end. Each blade root 16, 18 is generally round in cross-section and includes bolts, screws, studs 24, or other structure known in the art for attaching a wind turbine blade to a rotor of a wind turbine. The wind turbine blades 12, 14 typically extend up to 80-120 feet, or more, and gradually curve from the blade root to the blade tip, creating a convex surface 26 on one side and a concave surface 28 on the opposite side. In addition, the wind turbine blades 12, 14 may have a rounded leading edge 30 (i.e., the edge facing the direction of rotation) and a tapered trailing edge 32 (i.e., the edge facing away from the direction of rotation) that combine to give the wind turbine blades 12, 14 an aerodynamic or airfoil shape.

The wind turbine blades 12, 14 shown in FIGS. 1, 2, and 3 are arranged in an inverted position to one another with the concave surfaces 28 facing one another and the leading edges 30 down. As a result, each blade root 16, 18 is near or proximate to the blade tip 20, 22 of the opposite wind turbine blade, and the opposing concave surfaces 28 create a space 33 between the first and second wind turbine blades 12, 14 near the middle of the wind turbine blades.

The system 10 generally includes first and second root cradles 34, 36 and first and second tip cradles 38, 40. The root and tip cradles provide support and cushioning for the blade roots and blade tips, respectively. For convention throughout this description, the first root cradle 34 and the first tip cradle 38 refer to the structures that support the first wind turbine blade 12, and the second root cradle 36 and the second tip cradle 40 refer to the structures that support the second wind turbine blade 14. As shown in FIGS. 1, 2, and 3, the first and second root cradles 34, 36 are opposed to each other and are separated by a distance that is approximately equal to the length of the wind turbine blades. The first tip cradle 38 is located closer to or proximate to the second root cradle 36 to support and cushion the blade tip 20 of the first wind turbine blade 12, and the second tip cradle 40 is located closer to or proximate to the first root cradle 34 to support and cushion the blade tip 22 of the second wind turbine blade 14. In particular embodiments, a frame 42 around the first and second root cradles 34, 36 may connect to and support the second and first tip cradles 40, 38, respectively, as shown in FIGS. 1 and 2. In other particular embodiments, the tip cradles may be structurally separate from the proximate root cradles.

The root cradles 34, 36 and tip cradles 38, 40 generally include cushions 44 or pads that form a seating surface which conforms to the exterior surface of the blade root or blade tip. The weight of the wind turbine blades 12, 14 against the cushions 44 holds the wind turbine blades 12, 14 in place. The cushions 44 or pads may be configured to completely or partially surround the blade roots 16, 18 and/or blade tips 20, 22. Alternatively, a strap 46, banding, or other suitable device may be used to hold the wind turbine blades 12, 14 in place.

As illustrated in FIG. 2, the first and second tip cradles 38, 40 define first and second support planes 48, 50, respectively, that are angled approximately 30 to 60 degrees with respect to a horizontal line 49. In particular embodiments, the first and second support planes 48, 50 may be angled approximately 35 to 55 degrees, 40 to 50 degrees, or 45 degrees with respect to the horizontal line 49. The first and second tip cradles 38, 40 and associated first and second support planes 48, 50 thus position the first and second blade tips 20, 22 diagonally with respect to the second and first root cradles 18, 16, respectively. The first and second support planes 48, 50 may include a first surface formed from the cushions 44 or pads in the respective tip cradle, with or without a second surface opposed to the first surface. The second surface, if present, may include additional cushions 44 or pads, or the second surface may simply be a strap 46, banding, or other suitable devices to secure the blade tips 20, 22 in the tip cradles 38, 40.

As shown in FIGS. 1, 2, and 3, the system 10 further includes a clamp 56 between the first and second root cradles 34, 36 and near or proximate to the middle of the first and second wind turbine blades 12, 14. Padded frames 58 may surround the first and second wind turbine blades 12, 14 and connect the clamp 56 to the first and second wind turbine blades 12, 14. The clamp 56 may include a turnbuckle 60, winch, pulley, ram, or other equivalent device known to one of ordinary skill in the art to provide a mechanical advantage for moving at least a portion of the first and second wind turbine blades 12, 14 together. For example, rotation of the turnbuckle 60 may cause the clamp 56 to retract and move at least a portion of the first and second wind turbine blades 12, 14 together. The retracted clamp 56 thus at least partially straightens one or both of the wind turbine blades 12, 14 to reduce the space 33 between the wind turbine blades 12, 14. Other suitable and equivalent means for straightening at least one of the wind turbine blades 12, 14 may include counterweights and/or hydraulic, pneumatic, or electromechanical presses.

FIG. 2 shows the embodiment of the system 10 and wind turbine blades 12, 14 shown in FIG. 1 with the clamp 56 in a retracted position. As a result, the middle of the first and second wind turbine blades 12, 14 are drawn closer together, thereby reducing the space 33 between the wind turbine blades 12, 14.

FIG. 3 shows the embodiment of the system 10 and wind turbine blades 12, 14 shown in FIGS. 1 and 2 loaded on a commercial carrier 62 for transport and/or storage. The orientation of the system 10 and wind turbine blades 12, 14 in FIG. 3 has been reversed from that shown in FIGS. 1 and 2 to show the opposite side of the system 10 not visible in FIGS. 1 and 2. As shown in FIG. 3, the first and second tip cradles 38, 40 and the first and second root cradles 34, 36 support the first and second wind turbine blades 12, 14 at an angle approximately 30 to 60 degrees with respect to the horizontal line 49. In particular embodiments, the first and second wind turbine blades 12, 14 may be angled approximately 35 to 55 degrees, 40 to 50 degrees, or 45 degrees with respect to the horizontal line 49. As a result, the system 10 arranges the wind turbine blades 12, 14 approximately diagonally with respect to the horizontal line 49 to reduce the width and height of the system 10 and wind turbine blades 12, 14 during transportation and/or storage.

Figure 4:
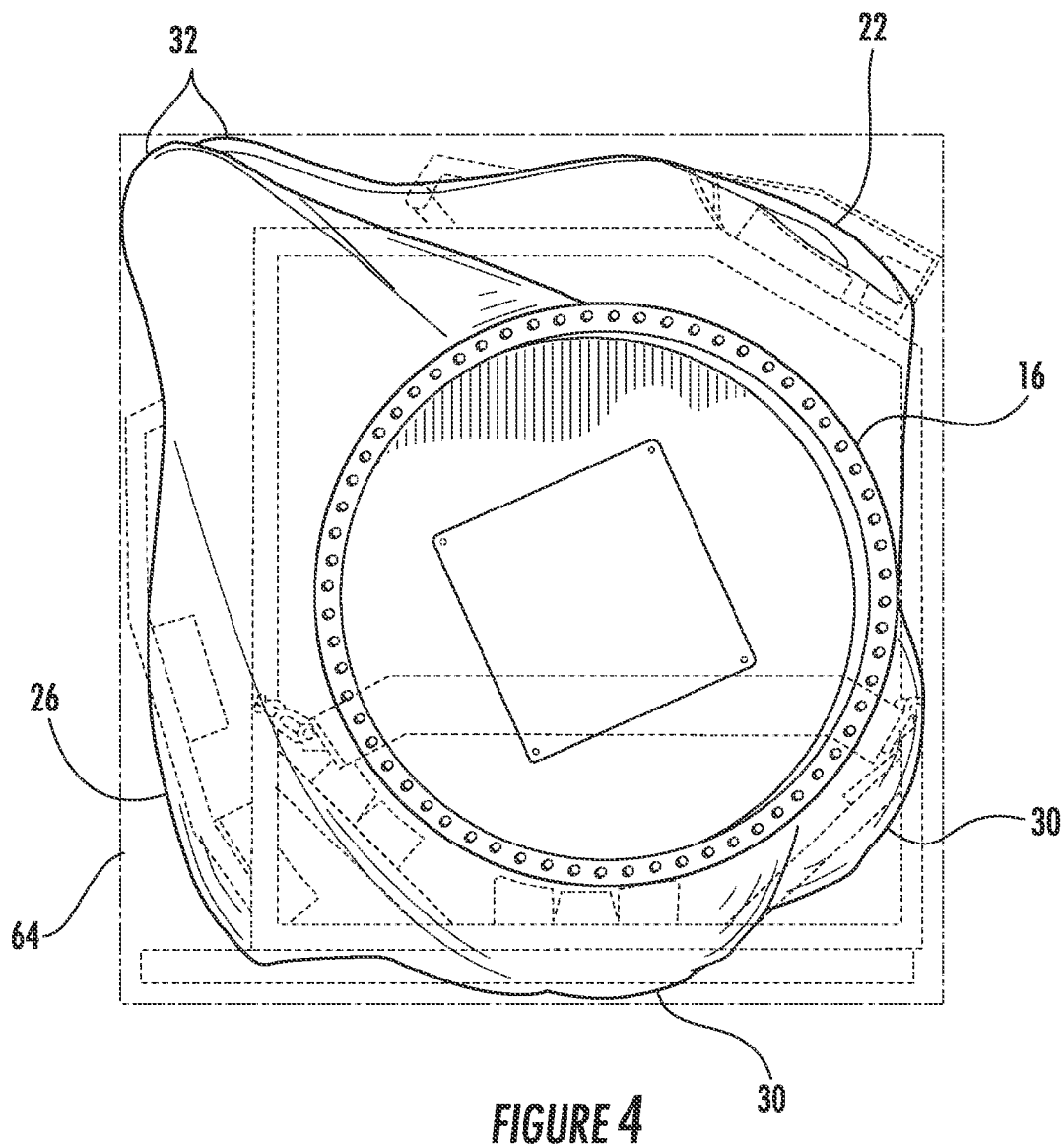
FIG. 4 is an end view of the system and wind turbine blades shown in FIG. 2.

FIG. 4 shows an end view of the system 10 (in phantom) and wind turbine blades shown in FIG. 2. A shipping area 64 for the system 10 and the wind turbine blades 12, 14 is defined as the maximum width and height of the outer perimeter of the system 10 and wind turbine blades 12, 14. The shipping area 64 is shown in FIG. 4 as a dashed box circumscribing the outer perimeter of the system 10 and wind turbine blades 12, 14. With the wind turbine blades 12, 14 arranged within the system 10, the shipping area has a maximum width of 8½ feet and a maximum height of 13½ feet. It will be appreciated that the shipping area 64 defined by the system 10 and wind turbine blades 12, 14 may fit within or extend beyond the width and height of the commercial carrier 62. As a result, the system 10 arranges the wind turbine blades 12, 14 for transportation and/or storage without exceeding state and local transportation regulations regarding the maximum width and height of items transported on public roads.

Figure 5:
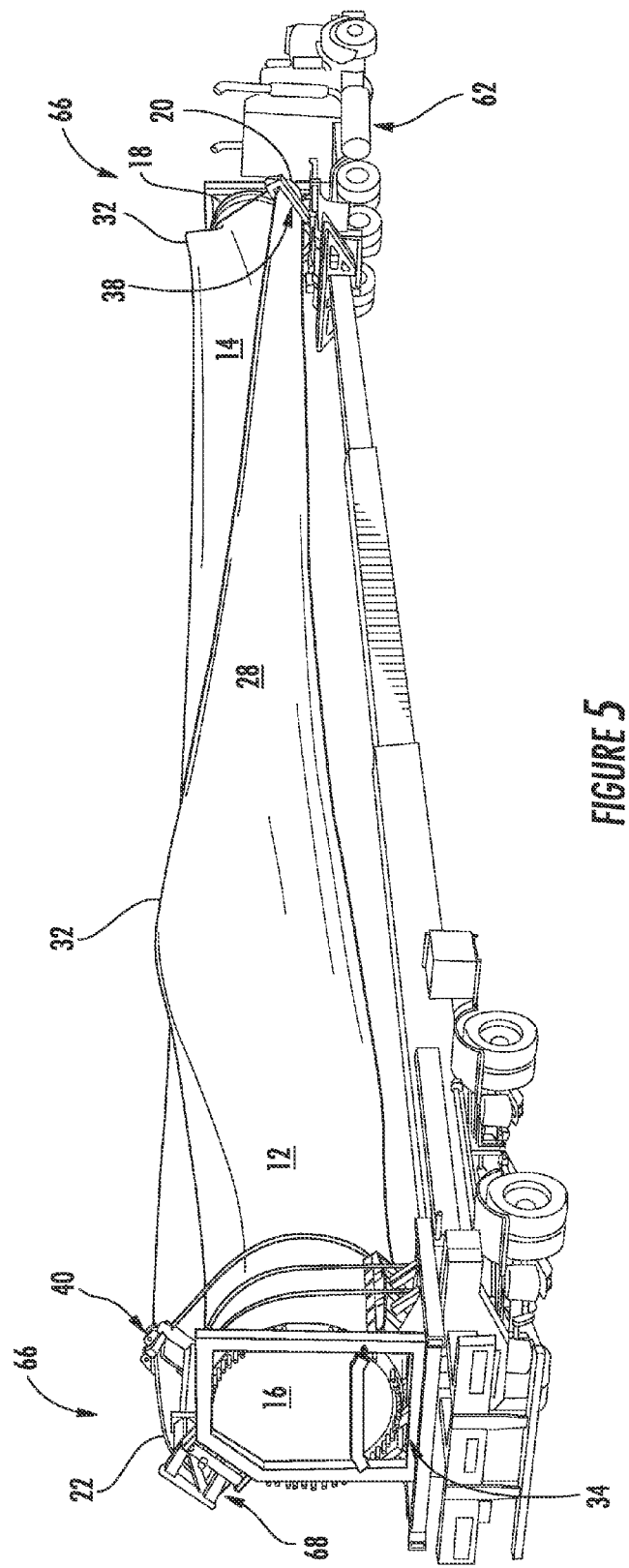
FIG. 5 is a perspective view of a system for arranging wind turbine blades according to a second embodiment of the present invention.

FIG. 5 provides a perspective view of a system 66 for arranging the first and second wind turbine blades 12, 14 on the commercial carrier 62 according to a second embodiment of the present invention. In this illustration, the wind turbine blades 12, 14 again generally include blade roots 16, 18, blade tips 20, 22, convex 26 and concave 28 surfaces, and leading 30 and trailing 32 edges as previously described and illustrated with respect to the wind turbine blades 12, 14 shown in FIGS. 1, 2, and 3.

The wind turbine blades 12, 14 shown in FIG. 5 are arranged in an inverted position to one another with the leading edges 30 down, similar to the orientation of the wind turbine blades 12, 14 shown in FIGS. 1, 2, and 3. However, in FIG. 5, the wind turbine blades 12, 14 are oriented so that the convex surfaces 26 face one another. As a result, the opposing convex surfaces 26 are near or proximate to one another, and the curvature of the wind turbine blades 12, 14 initially creates a space between each blade root 16, 18 and the blade tip 22, 20 of the opposite wind turbine blade.

The system 66 shown in FIG. 5 again includes first and second root cradles 34, 36 and first and second tip cradles 38, 40 which define first and second support planes as previously described and illustrated with respect to the system 10 shown in FIGS. 1, 2, and 3. In addition, the system 66 further includes one or more clamps 68 near or proximate to the end of the wind turbine blades 12, 14. Each clamp 68 provides a means for straightening a wind turbine blade by moving a tip cradle and blade tip toward the proximate root cradle and blade root. For example, as shown in FIG. 5, the clamp 68 may be near or proximate to the first blade root 16, first root cradle 34, second blade tip 22, and second blade cradle 40. The clamp 68 may connect to the first and second wind turbine blades 12, 14, either directly or indirectly. For example, padded frames surrounding the first blade root 16 and/or second blade tip 22 may be used to connect the clamp 68 directly to the first and second wind turbine blades 12, 14. Alternatively, the clamp 68 may connect indirectly to the first and second wind turbine blades 12, 14 through connections to the first root cradle 34 and the second tip cradle 40. The clamp 68 may include a turnbuckle, winch, pulley, ram, or other equivalent device known to one of ordinary skill in the art to provide a mechanical advantage for moving the second tip cradle 40 (and second blade tip 22) toward the first root cradle 34 (and first blade root 16). For example, rotation of the turnbuckle may cause the clamp 68 to retract and move the second tip cradle 40 (and second blade tip 22) toward the first root cradle 34 (and first blade root 16). The retracted clamp 68 thus straightens the second 12 wind turbine blade to reduce the space between the second tip cradle 40 (and second blade tip 22) and the first root cradle 34 (and first blade root 16). Other suitable and equivalent means for straightening the wind turbine blades or moving at least a portion of one wind turbine blade toward the other wind turbine blade include counter-weights and/or hydraulic, pneumatic, or electromechanical presses.

The system 66 shown in FIG. 5 is appropriately used when the wind turbine blades 12, 14 are arranged with the convex surfaces 26 facing one another, and it provides the same beneficial reduced shipping area 64 as previously discussed with respect to the system 10 described and illustrated in FIGS. 1, 2, and 3. Specifically, with the first and second wind turbine blades 12, 14 arranged within the system 66, the shipping area 64 has a maximum width of 8½ feet and a maximum height of 13½ feet. As a result, the system 66 arranges the wind turbine blades 12, 14 for transportation and/or storage without exceeding state and local transportation regulations regarding the maximum width and height of items transported on public roads.

The two embodiments shown in FIGS. 1-5 provide a method for arranging at least two wind turbine blades 12, 14 for transport and/or storage. The first wind turbine blade 12 may be transferred proximate to the first root cradle 34. The first wind turbine blade 12 may be rotated, as necessary, so that the first wind turbine blade 12 rests in the first root cradle 34 and the first tip cradle 38 at an angle approximately 30 to 60 degrees with respect to the horizontal line 49. The second wind turbine blade 14 may be transferred proximate to the second root cradle 36. The second wind turbine blade 14 may be rotated, as necessary, so that the second wind turbine blade 14 rests in the second root cradle 36 and the second tip cradle 40 at an angle of approximately 30 to 60 degrees with respect to the horizontal line 49. In particular embodiments, the first and second wind turbine blades 12, 14 may be angled approximately 35 to 55 degrees, 40 to 50 degrees, or 45 degrees with respect to the horizontal line 49.

If the first and second wind turbine blades 12, 14 are oriented so that the concave surfaces 28 face one another, the clamp 56 or other suitable means for straightening at least one of the first or second wind turbine blades 12, 14, as shown in FIGS. 1, 2, and 3, may be used to straighten at least one of the wind turbine blades and move at least a portion of the first wind turbine blade 12 toward at least a portion of the second wind turbine blade 14. Alternatively, if the first and second wind turbine blades 12, 14 are oriented so that the convex surfaces 26 face one another, as shown in FIG. 5, one or more clamps 68 or other suitable means may be used to straighten at least one of the wind turbine blades and move at least a portion of the first wind turbine blade 12 toward at least a portion of the second wind turbine blade 14.

Figure 6:
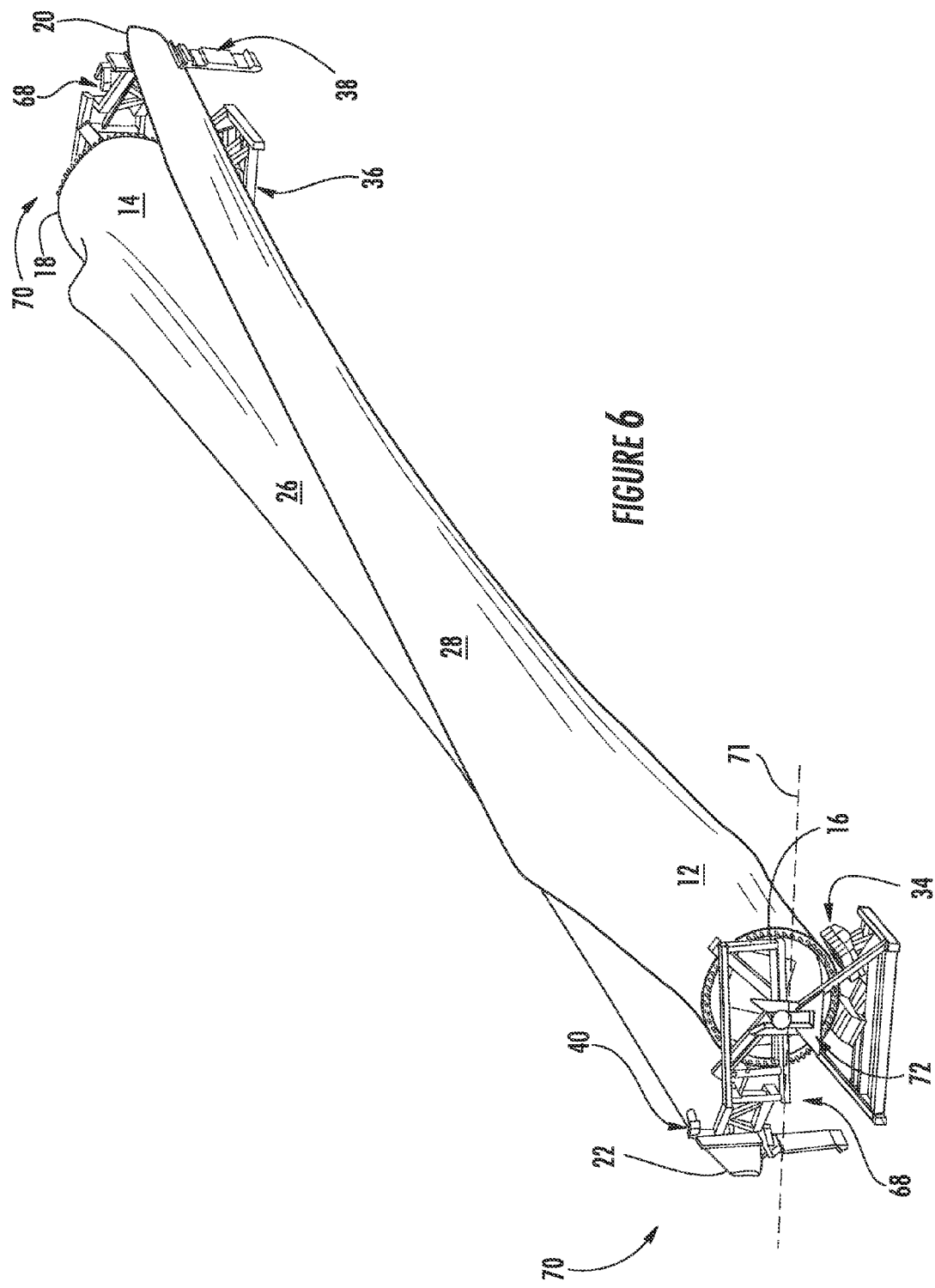
FIG. 6 is a perspective view of a system for arranging wind turbine blades according to a third embodiment of the present invention.
Figure 7:
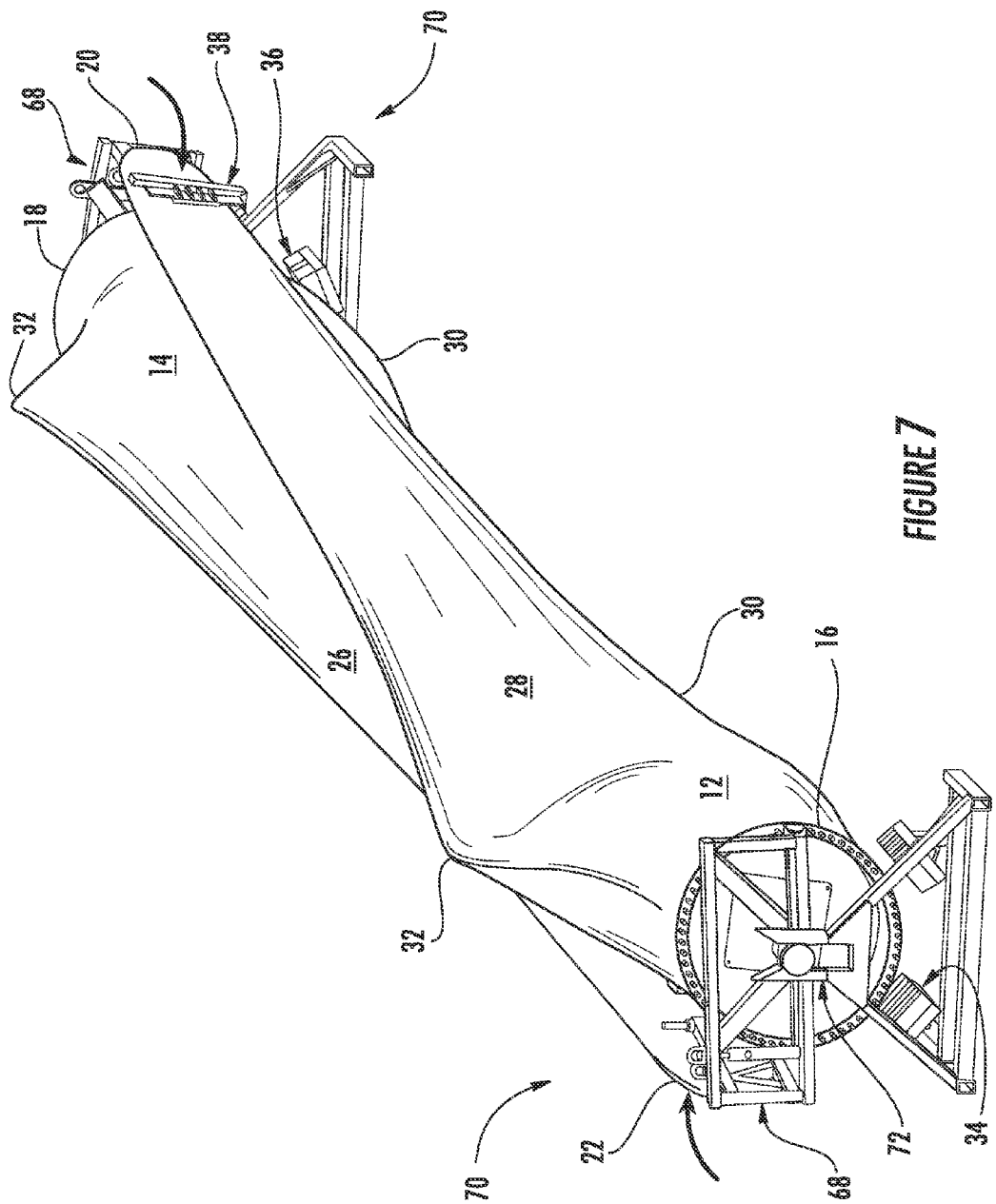
FIG. 7 is a perspective view of the system shown in FIG. 6 with the ends of the wind turbine blades drawn closer together.

FIGS. 6 and 7 provide perspective views of a system 70 for arranging the first and second wind turbine blades 12, 14 for transport and/or storage according to a third embodiment of the present invention. In these illustrations, the wind turbine blades 12, 14 again generally include blade roots 16, 18, blade tips 20, 22, convex 26 and concave 28 surfaces, and leading 30 and trailing 32 edges as previously described and illustrated with respect to the wind turbine blades 12, 14 shown in FIGS. 1, 2, and 3.

The wind turbine blades 12, 14 shown in FIGS. 6 and 7 are arranged in an inverted position to one another with the convex surfaces 26 facing one another and the leading edges 30 down. As a result, the opposing convex surfaces 26 are near or proximate to one another, and the curvature of the wind turbine blades initially creates a space between each blade root 16, 18 and the blade tip 22, 20 of the opposite wind turbine blade. However, in contrast to the previously described embodiments, the wind turbine blades 12, 14 are initially oriented substantially vertically with respect to a horizontal line 71.

The system 70 shown in FIGS. 6 and 7 again includes first and second root cradles 34, 36 and first and second tip cradles 38, 40 which define first and second support planes as previously described and illustrated with respect to the system 10 shown in FIGS. 1, 2, and 3. However, because the wind turbine blades 12, 14 are initially oriented substantially vertically with respect to the horizontal line 71, the first and second tip cradles 38, 40 and associated first and second support planes are also initially substantially vertical with respect to the horizontal line 71.

The system 70 shown in FIGS. 6 and 7 additionally includes one or more clamps 68 near or proximate to the end of the wind turbine blades 12, 14 as previously described and illustrated with respect to the system 66 shown in FIG. 5. Retraction of the clamps 68, as shown by the arrows in FIG. 7, straightens the first and second wind turbine blades 12, 14 to reduce the space between the first/second tip cradles 38, 40 (first/second blade tips 20, 22) and the proximate second/first root cradles 36, 34 (second/first blade roots 18, 16).

Figure 8:
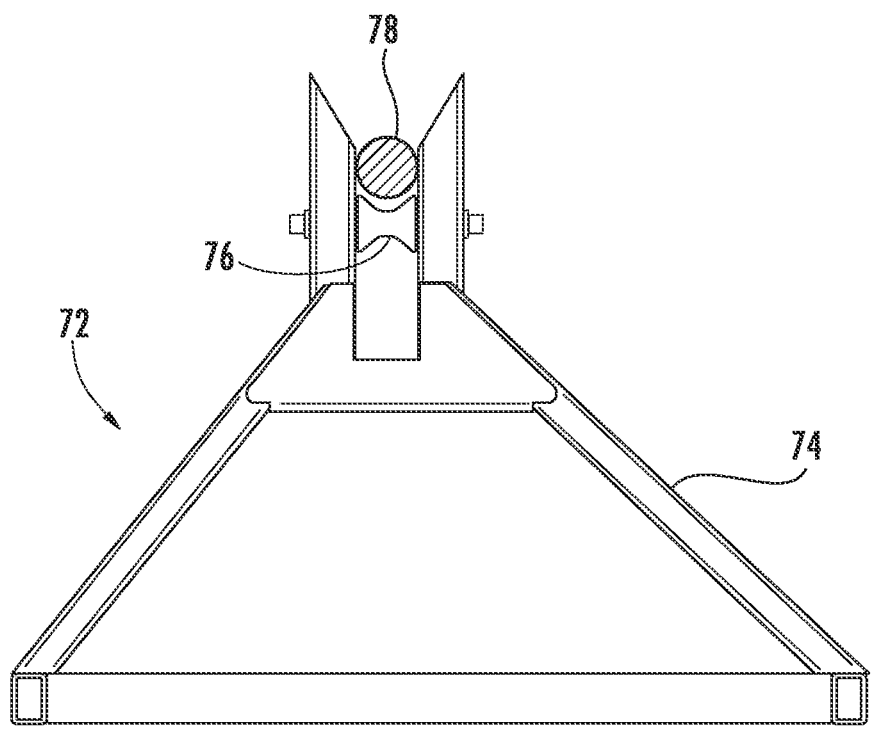
FIG. 8 is an end view of a pivotal connection according to one embodiment of the present invention.

The system 70 shown in FIGS. 6 and 7 further includes a pivotal connection 72 attached to the blade root 16, 18 of each wind turbine blade 12, 14. FIG. 8 provides an end view of one embodiment of the pivotal connection 72 shown in FIGS. 6 and 7. As shown in FIG. 8, the pivotal connection 72 may include a bracket 74, a hinge pin 76, and a shaft 78. The bracket 74 and hinge pin 76 support the shaft 78 and allow the shaft 78 to freely rotate. The shaft 78 connects to the blade root 16, 18 of each wind turbine blade 12, 14 to enable the first and second wind turbine blades 12, 14 to be rotated at least partially about each other, either before or after retraction of the clamps 68.

Figure 9:
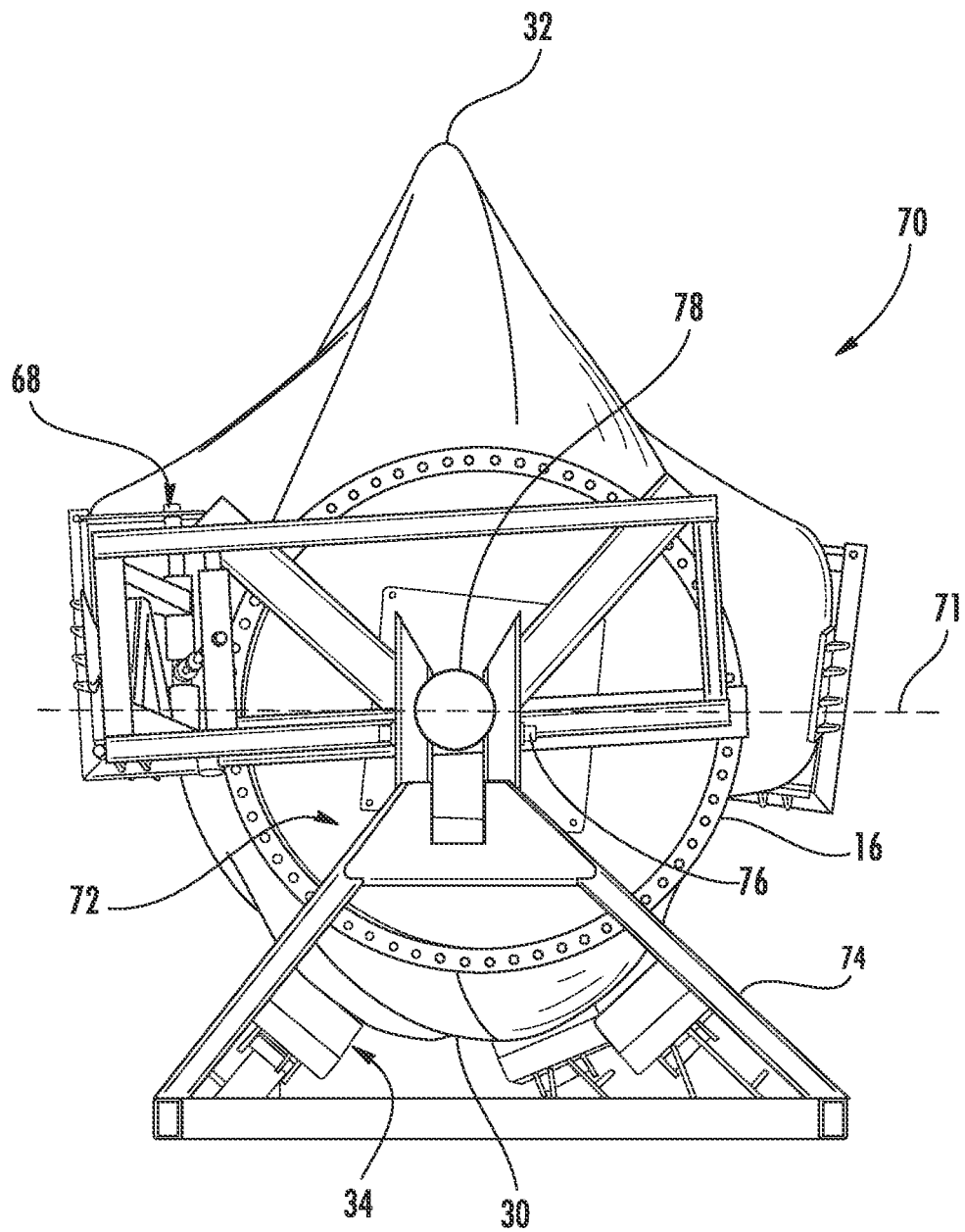
FIG. 9 is an end view of the system shown in FIG. 7 with the wind turbine blades oriented in a substantially vertical position.
Figure 10:
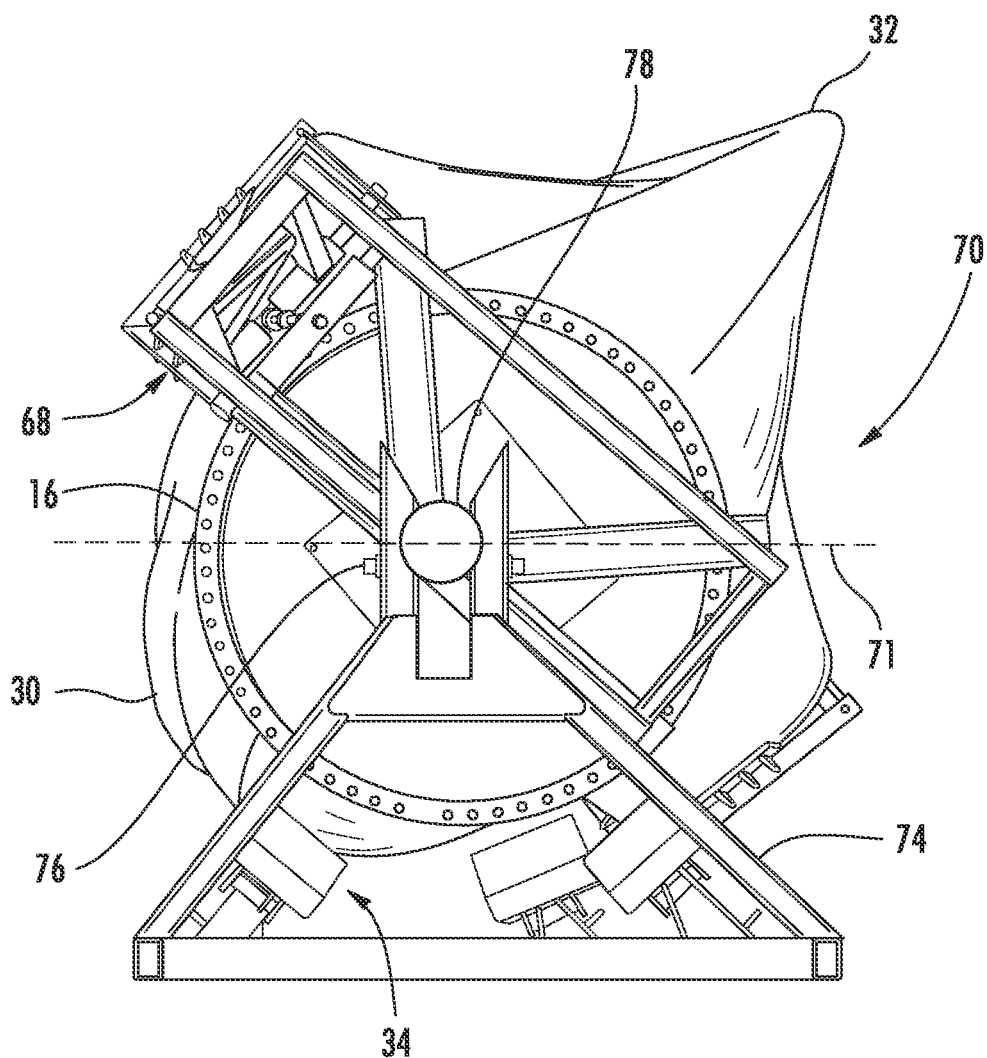
FIG. 10 is an end view of the system shown in FIG. 7 with the wind turbine blades rotated approximately 30 to 60 degrees with respect to the horizon.

FIG. 9 shows an end view of the system 70 shown in FIG. 7. As shown, the pivotal connection 72 supports the vertically oriented wind turbine blades 12, 14 slightly above the root cradles 34, 36. This allows the pivotal connection 72 to rotate the first and second wind turbine blades 12, 14 with respect to each other until each wind turbine blade is angled approximately 30 to 60 degrees with respect to the horizontal line 71, as shown in FIG. 10. In particular embodiments, the first and second wind turbine blades 12, 14 may be angled approximately 35 to 55 degrees, 40 to 50 degrees, or 45 degrees with respect to the horizontal line 71. When the wind turbine blades 12, 14 have been adequately rotated about one another, the hinge pin 76 may be removed, and the shaft 78 lowered to allow the first and second wind turbine blades 12, 14 to rest in the first and second root cradles 34, 36, respectively.

Figure 11:
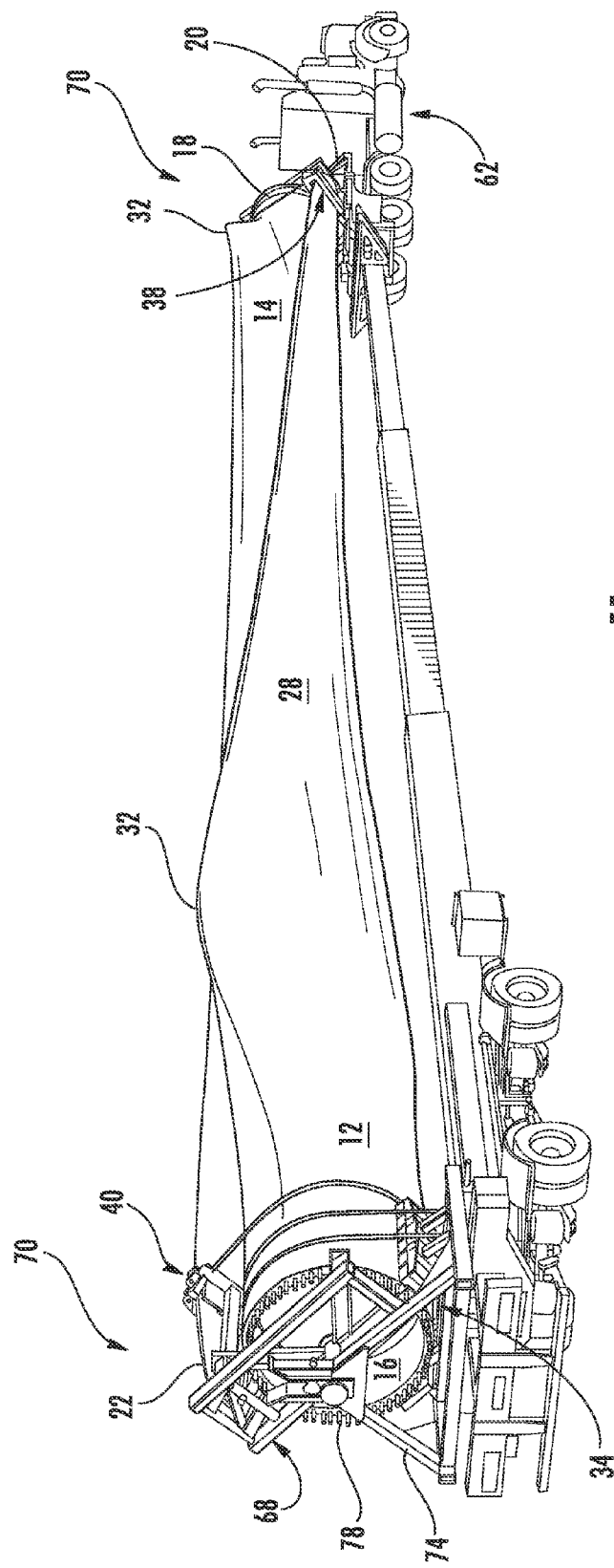
FIG. 11 is a perspective view of the system shown in FIG. 10 loaded on a commercial carrier; and, FIG. 12 is an end view of the system shown in FIG. 10.

FIG. 11 is a perspective view of the system 70 shown in FIG. 10 loaded on the commercial carrier 62 for transport and/or storage. The first and second tip cradles 38, 40 and the first and second root cradles 34, 36 support the first and second wind turbine blades 12, 14 at an angle approximately 30 to 60 degrees with respect to the horizontal line 71. As a result, the system 70 arranges the first and second turbine blades 12, 14 approximately diagonally with respect to the horizontal line 71 to reduce width and height of the system 70 and wind turbine blades 12, 14 during transportation and/or storage.

Figure 12:
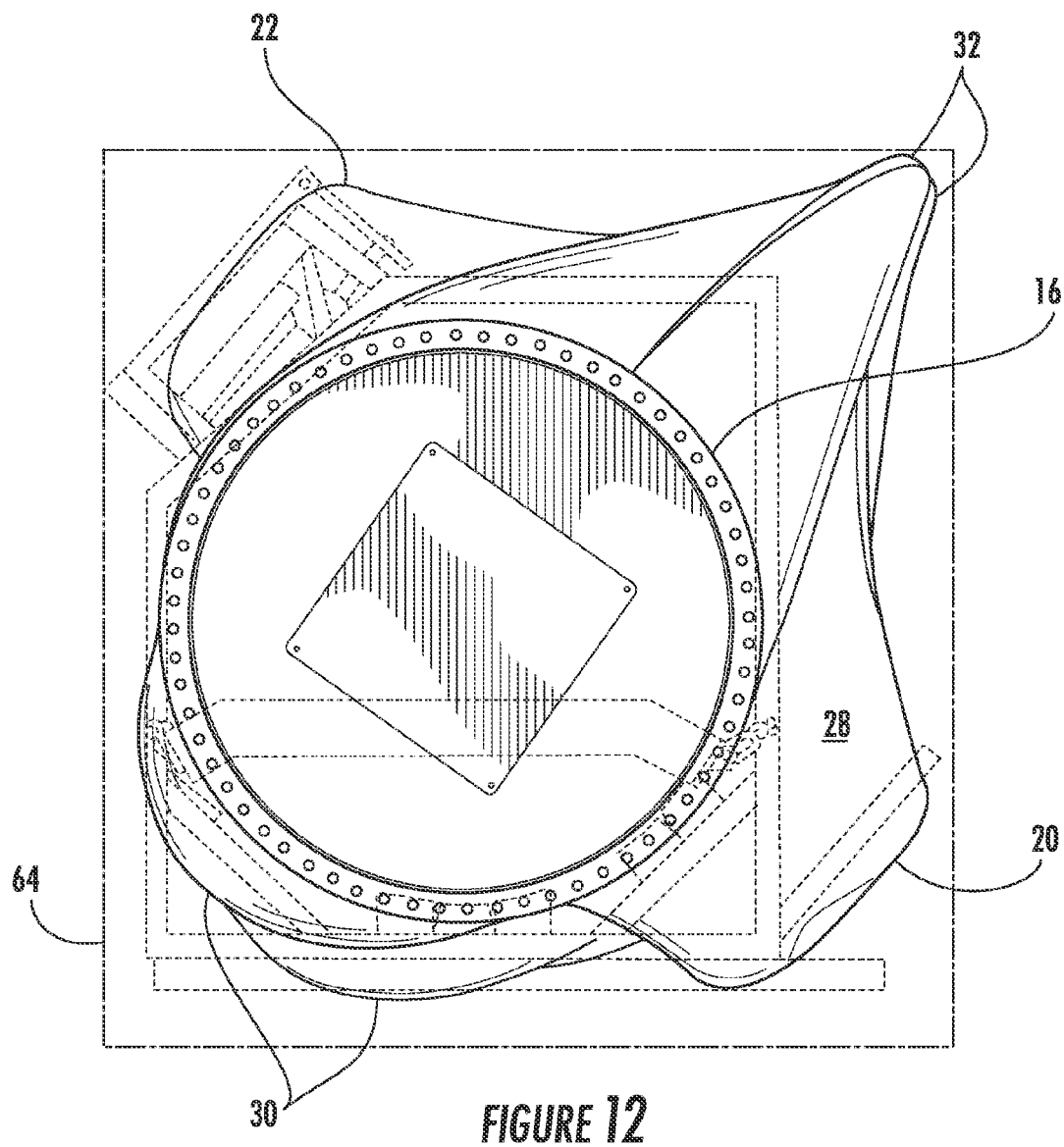

FIG. 12 shows an end view of the system 70 (in phantom) and wind turbine blades 12, 14 shown in FIG. 10. The shipping area 64 is shown in FIG. 12 as a dashed box circumscribing the outer perimeter of the system 70 and the wind turbine blades 12, 14. With the first and second wind turbine blades 12, 14 arranged approximately diagonally by the system 70, the shipping area 64 has a maximum width of 8½ feet and a maximum height of 13½ feet. It will be appreciated that the shipping area 64 defined by the system 70 and wind turbine blades 12, 14 may fit within or extend beyond the width and height of the commercial carrier 62. As a result, the system 70 arranges the wind turbine blades 12, 14 for transportation and/or storage without exceeding state and local transportation regulations regarding the maximum width and height of items transported on public roads.

The system 70 described and shown in FIGS. 6-11 provides a method for arranging at least two wind turbine blades 12, 14 for transport and/or storage. The first wind turbine blade 12 may be transferred proximate to the first root cradle 34, and the second wind turbine blade 14 may be transferred proximate to the second root cradle 36. If the first and second wind turbine blades 12, 14 are oriented so that the concave surfaces 28 face one another, the clamp 56 or other suitable means for straightening at least one of the first or second wind turbine blades 12, 14, as shown in FIGS. 1, 2, and 3, may be used to straighten at least one of the wind turbine blades and move at least a portion of the first wind turbine blade 12 toward at least a portion of the second wind turbine blade 14. Alternatively, if the first and second wind turbine blades 12, 14 are oriented so that the convex surfaces 26 face one another, as shown in FIG. 6, one or more clamps 68 or other suitable means may be used to straighten at least one of the wind turbine blades and move at least a portion of the first wind turbine blade 12 toward at least a portion of the second wind turbine blade 14. At least a portion of the first and second wind turbine blades 12, 14 may be rotated about one another, as necessary, so that the first and second wind turbine blades rest 12, 14 in the respective root 34, 36 and tip 38, 40 cradles at an angle approximately 30 to 60 degrees with respect to the horizontal line 71. In particular embodiments, the first and second wind turbine blades 12, 14 may be angled approximately 35 to 55 degrees, 40 to 50 degrees, or 45 degrees with respect to the horizontal line 71.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for arranging first and second wind turbine blades, comprising:
   a. a first root cradle adapted to support a root of the first wind turbine blade;
   b. a second root cradle adapted to support a root of the second wind turbine blade, opposed to said first root cradle, and separated from said first root cradle by a distance approximately equal to a length of the first and second wind turbine blades;
   c. a first tip cradle proximate to said second root cradle, wherein said first tip cradle defines a first support plane angled approximately 30 to 60 degrees with respect to a horizontal line; and,
   d. a second tip cradle proximate to said first root cradle, wherein said second tip cradle defines a second support plane angled approximately 30 to 60 degrees with respect to the horizontal line.

2. The system of claim 1, further including means for straightening at least one of the first or second wind turbine blades.

3. The system of claim 1, further including a clamp between said first and second root cradles and connected to the first and second wind turbine blades.

4. The system of claim 1, further including means for moving said second tip cradle toward said first root cradle.

5. The system of claim 1, further including a first clamp connected to said first root cradle and said second tip cradle.

6. The system of claim 5, further including a second clamp connected to said second root cradle and said first tip cradle.

7. The system of claim 1, further including a pivotal connection attached to the first and second wind turbine blades.

8. The system of claim 1, wherein at least one of said first support plane or said second support plane comprises a first surface and a second surface opposed to said first surface.

9. The system of claim 1, wherein said first and second root cradles and the first and second wind turbine blades define a shipping area having a width less than or equal to 8.5 feet.

10. The system of claim 1, wherein said first and second root cradles and the first and second wind turbine blades define a shipping area having a height less than or equal to 13.5 feet.

11. A system for arranging first and second wind turbine blades, comprising:
  a. a first root cradle adapted to support a root of the first wind turbine blade;
  b. a second root cradle adapted to support a root of the second wind turbine blade, opposed to said first root cradle, and separated from said first root cradle by a distance approximately equal to a length of the first and second wind turbine blades;
  c. a first tip cradle proximate to said second root cradle; and
  d. a second tip cradle proximate to said first root cradle,
  wherein at least one of said first tip cradle or said second tip cradle defines a support plane angled approximately 30 to 60 degrees with respect to a horizontal line.

12. The system of claim 11, further including means for straightening at least one of the first or second wind turbine blades.

13. The system of claim 11, further including a clamp between said first and second root cradles and connected to the first and second wind turbine blades.

14. The system of claim 11, further including means for moving said second tip cradle toward said first root cradle.

15. The system of claim 11, further including a first clamp connected to said first root cradle and said second tip cradle.

16. The system of claim 15, further including a second clamp connected to said second root cradle and said first tip cradle.

17. The system of claim 11, wherein said support plane comprises a first surface and a second surface opposed to said first surface.

* * * * *